UNITED STATES PATENT OFFICE.

GEORGE T. LEWIS, OF PHILADELPHIA, PENNSYLVANIA.

LIQUID PAINT.

SPECIFICATION forming part of Letters Patent No. 297,139, dated April 22, 1884.

Application filed December 6, 1882. (No specimens.)

*To all whom it may concern:*

Be it known that I, GEORGE T. LEWIS, of Philadelphia, State of Pennsylvania, have invented a new and useful Improved Liquid Paint, of which the following is a full, clear, and exact description.

Attempts have heretofore been made to manufacture a liquid paint from the pigment produced from the waste fumes of lead-smelting furnaces—a substance consisting, mainly, of sulphate and oxide of lead, forming mixed or compound salts of lead, and commercially known as "sublimed white lead"—but have proved unsuccessful, the emulsion produced by ordinary means not being stable when this pigment is used. I have discovered that a liquid paint may be made with this pigment of lead salts by taking a mixture of this sublimed white-lead or lead-salts pigment and linseed-oil and adding thereto a solution of resin or resinous gum in soda or potash and mixing it thoroughly until a complete mixture is formed. The resinous alkaline solution I prepare, preferably, by dissolving the resin or resinous gum in a solution of soda or potash, the strength of the solution varying with the kind of resin or gum employed. If ordinary resin is used, I make the solution, preferably, by boiling together the materials in the proportion of, say, twenty pounds of resin and two to four pounds of caustic soda, of seventy-six (76) per cent., together with about five hundred pounds of water. It is advisable to use but a small quantity of water in the mixture while the resin is being saponified, and to add sufficient to make up the five hundred pounds on the completion of the saponification. This resinous solution is added to a mixture of the sublimed lead and oil prepared by grinding, say, a hundred pounds of the lead with from one and a quarter to one and a half gallons of oil, thinned by the addition of about four and a quarter more of oil, one gallon of this mixture being used, together with from three quarters of a gallon to a gallon of the resinous solution, and the whole mixed until a complete liquid paint is formed.

Turpentine or benzine may be used in this paint, the oil being proportionately diminished; but I have found that the use of resin in the above-described solution causes the paint to dry so quickly that their use is not essential. Beside drying quickly, the paint prepared in this way is very glossy, and is more easily applied than ordinary liquid paints, being free from the gelatinous character which the commercial article usually has. The ordinary tints or colors may be added in the usual way.

I do not limit myself to the exact proportions or quantities given, as they may be varied considerably without departing from my invention.

I obtain my sublimed white-lead or lead salts pigment from their native ores by substantially the same treatment or process described in Letters Patent granted me in March 14, 1871, No. 112,608; July 4, 1871, No. 116,604, and subsequently to myself and E. O. Bartlett.

What I claim is—

A liquid paint consisting of sublimed white lead, oil, and an alkaline solution of resin, combined substantially as and in the proportions specified.

In testimony of which invention I hereunto set my hand.

GEORGE T. LEWIS.

Witnesses:
WM. FISHER LEWIS,
R. S. CHILD, Jr.